United States Patent
Peng et al.

(10) Patent No.: US 9,002,848 B1
(45) Date of Patent: Apr. 7, 2015

(54) AUTOMATIC INCREMENTAL LABELING OF DOCUMENT CLUSTERS

(75) Inventors: Jun Peng, San Ramon, CA (US); Aner Ben-Artzi, Los Angeles, CA (US); Kirill Buryak, Sunnyvale, CA (US); Glenn M. Lewis, Costa Mesa, CA (US)

(73) Assignee: Google Inc., Mountain View, CA (US)

( * ) Notice: Subject to any disclaimer, the term of this patent is extended or adjusted under 35 U.S.C. 154(b) by 364 days.

(21) Appl. No.: 13/530,764

(22) Filed: Jun. 22, 2012

Related U.S. Application Data (60) Provisional application No. 61/580,503, filed on Dec. 27, 2011, provisional application No. 61/594,769, filed on Feb. 3, 2012.

(51) Int. Cl.
*G06F 17/30* (2006.01)

(52) U.S. Cl.
CPC .................................. *G06F 17/0893* (2013.01)

(58) Field of Classification Search
CPC ..................... G06F 17/30705; G06F 17/30707
USPC .................................................. 707/737, 738
See application file for complete search history.

(56) References Cited

U.S. PATENT DOCUMENTS

| | | | |
|---|---|---|---|
| 6,751,614 B1 | 6/2004 | Rao | |
| 7,158,986 B1 | 1/2007 | Oliver et al. | |
| 7,401,087 B2 | 7/2008 | Copperman et al. | |
| 7,496,567 B1 | 2/2009 | Steichen | |
| 7,584,100 B2 | 9/2009 | Zhang et al. | |
| 7,593,904 B1 | 9/2009 | Kirshenbaum et al. | |
| 7,937,345 B2 | 5/2011 | Schmidtler et al. | |
| 7,958,067 B2 | 6/2011 | Schmidtler et al. | |
| 8,027,979 B2 | 9/2011 | Liao et al. | |
| 8,051,080 B2 | 11/2011 | Kraft et al. | |
| 8,090,717 B1 | 1/2012 | Bharat et al. | |
| 8,140,515 B2 | 3/2012 | Pradhan et al. | |
| 8,145,618 B1 | 3/2012 | Pfleger et al. | |
| 8,214,346 B2 | 7/2012 | Pradhan et al. | |
| 8,219,593 B2 | 7/2012 | Tunkelang et al. | |
| 8,386,487 B1 * | 2/2013 | Ben-Artzi et al. | 707/737 |
| 8,543,576 B1 * | 9/2013 | Buryak et al. | 707/737 |
| 8,583,648 B1 * | 11/2013 | Majkowska | 707/737 |
| 2003/0130993 A1 | 7/2003 | Mendelevitch et al. | |
| 2004/0163034 A1 * | 8/2004 | Colbath et al. | 715/500 |
| 2005/0234955 A1 * | 10/2005 | Zeng et al. | 707/101 |
| 2006/0095521 A1 | 5/2006 | Patinkin | |
| 2006/0155575 A1 | 7/2006 | Gross | |
| 2006/0248053 A1 * | 11/2006 | Sanfilippo et al. | 707/3 |
| 2007/0027830 A1 | 2/2007 | Simons et al. | |

(Continued)

*Primary Examiner* — Mahesh Dwivedi
(74) *Attorney, Agent, or Firm* — Armstrong Teasdale LLP (57) ABSTRACT

Methods and systems for use in labeling documents within a cluster are provided. One example method includes assembling a set of documents including a first plurality of previously clustered documents and a second plurality of documents. Each of the first plurality of previously clustered documents has at least one label identifying a topic to which content of the document relates. The method includes partitioning documents from the set of documents into multiple clusters, determining if a dominant topic exists within one of the multiple clusters, determining a metric value for one of the multiple clusters based on the number of documents within the one of the multiple clusters having a label identifying the determined dominant topic, and labeling at least documents from the second plurality of documents within the one of the multiple clusters with the label identifying the dominant topic when the metric value exceeds a predetermined threshold.

20 Claims, 4 Drawing Sheets

(56) References Cited

U.S. PATENT DOCUMENTS

| | | |
|---|---|---|
| 2008/0086433 A1* | 4/2008 | Schmidtler et al. ............ 706/12 |
| 2010/0017487 A1 | 1/2010 | Patinkin |
| 2010/0122212 A1 | 5/2010 | Boudalier |
| 2010/0145940 A1 | 6/2010 | Chen et al. |
| 2010/0223276 A1 | 9/2010 | Al-Shameri et al. |
| 2010/0332583 A1 | 12/2010 | Szabo |
| 2011/0145178 A1 | 6/2011 | Schmidtler et al. |
| 2012/0078969 A1 | 3/2012 | Ananthanarayanan et al. |
| 2013/0031094 A1* | 1/2013 | Kozak ............................ 707/737 |
| 2013/0117267 A1 | 5/2013 | Buryak et al. |

* cited by examiner

AUTOMATIC INCREMENTAL LABELING OF DOCUMENT CLUSTERS

CROSS REFERENCE TO RELATED APPLICATIONS

This application claims priority to provisional patent application Ser. No. 61/580,503 filed on Dec. 27, 2011, and provisional patent application Ser. No. 61/594,769 filed on Feb. 3, 2012, which are both hereby incorporated by reference in their entirety.

BACKGROUND OF THE INVENTION

This invention relates generally to labeling documents within a set of documents, and more particularly, to network-based methods and system for labeling documents organized within a cluster.

Automated classification, or "labeling," of data may be used to efficiently organize, route, and/or process large quantities of data. As an example, support centers receive large amounts of documents related to support requests. Document labeling techniques, such as clustering, may be used to group together similar documents.

Various algorithms can be used to organize documents by producing different clusters of documents such that the documents within a given cluster share a common characteristic. Documents can include different types of electronic files such as text files, e-mails, images, metadata files, audio files, and presentations. A cluster can be labeled based on a common characteristic shared by the documents organized into the cluster. A label can identify various types of information such as a subject or theme of a given cluster and therefore facilitate classification. In some cases, document clusters can be labeled by manual inspection where an operator retrieves samples from different clusters and labels the clusters based on information from the samples.

Unfortunately, manual inspection of the documents for labeling purposes can be very time consuming and expensive, especially, when organizing large quantities of documents. Accordingly, it is desirable to have a system and method for automatically labeling documents including within a cluster of documents.

BRIEF DESCRIPTION OF THE INVENTION

In one aspect, a computer implemented method including executing instructions stored on a computer-readable medium is provided. The method includes assembling a set of documents. The set of documents includes a first plurality of previously clustered documents and a second plurality of documents. Each of the first plurality of previously clustered documents has at least one label identifying a topic to which content of the document relates. The method includes partitioning documents from the set of documents into multiple clusters, determining if a dominant topic exists within one of said multiple cluster, determining a metric value for one of the multiple clusters based on the number of documents within said one of the multiple clusters having a label identifying the determined dominant topic, and labeling at least documents from the second plurality of documents within said one of the multiple clusters with the label identifying the dominant topic when the metric value exceeds a predetermined threshold.

In another aspect, a system includes a storage device, a clustering engine and a labeling engine. The storage device is configured to store a set of documents, the set of documents including a first plurality of previously clustered documents and a second plurality of documents, each of the first plurality of previously clustered documents having at least one label identifying a topic to which content of the document relates. The clustering engine is configured to partition documents from the set of documents into multiple clusters, determine if a dominant topic exists within one of said multiple clusters, determine a metric value for said one of the multiple clusters based on the number of documents within said one of the multiple clusters having a label identifying the determined dominant topic. The labeling engine is configured to assign a label identifying the dominant topic to at least documents from the second plurality of documents within said one of the multiple clusters when the metric value exceeds a predetermined threshold.

In another embodiment, one or more computer-readable media having computer-executable instructions embodied thereon is provided. When executed by a processor, the computer-executable instructions cause the processor to partition documents from the set of documents into multiple clusters, determine if a dominant topic exists within one of said multiple clusters, determine a metric value for said one of the multiple clusters based on the number of documents within said one of the multiple clusters having a label identifying the determined dominant topic, and assign the label identifying the dominant to at least documents from the second plurality of documents within said one of the multiple clusters when the metric value exceeds a predetermined threshold.

The details of one or more implementations are set forth in the accompanying drawings and the description below. Other features, aspects, and advantages will become apparent from the description, the drawings, and the claims.

DETAILED DESCRIPTION OF THE INVENTION

The present disclosure describes methods and systems for use in automatically labeling documents within one or more clusters created by clustering a set of documents. The set of documents is generally made up of a plurality of documents previously clustered (whether labeled or not labeled), and a plurality of new documents, often received after a prior clustering and/or labeling operation.

A set of documents can be separated into various clusters. A cluster can be a combination of documents in which all of the documents share one or more characteristics based on one or more common characteristics. In some implementations, the clusters produced from a set of documents are labeled with an identifier that identifies the commonly shared characteristic of the documents that are members of the cluster. For example, if a set of documents includes electronic mails (e-mails) from users to a customer support department of a computer manufacturer, such e-mails can be clustered into various clusters depending on, for example, the type of complaints or comments that the e-mails pertain to. In such cases, the clusters may be assigned labels or identifiers such as "hardware comments," "software complaints," and "firmware" to facilitate ease of further processing. For example, once the user e-mails are partitioned and labeled into the above-mentioned clusters, the emails can be distributed for further analysis. One process for labeling document clusters could involve an individual reviewing a number of samples from each of the clusters and labeling the clusters based on the manual review of the limited sample. The accuracy of a labeling process based on manual review however may be affected by mislabeling or other mistakes made by the individual reviewer. Further, manual review can be time consuming if the number of clusters and/or the sizes of the samples are large. By automating the process of labeling document clusters, efficiency and speed of the labeling process can be significantly improved. Although the example embodiment described herein is complaints and/or comments, it is contemplated that this process can be applied to processing electronic documents such as email messages, messages from online forums (e.g., support forums or message boards), other types of messages, web pages, reviews of products and/or services, news articles, editorials, blogs, text files, images, metadata files, audio files, presentations, and other electronic documents by a party in industrial, commercial, and residential applications.

In some embodiments, technical effects of the methods, systems, and computer-readable media described herein include at least one of: (a) assembling a set of documents, the set of documents including a first plurality of previously clustered documents and a second plurality of documents, each of the first plurality of previously clustered documents having at least one label identifying a topic to which content of the document relates, (b) partitioning documents from the set of documents into multiple clusters, (c) determining if a dominant topic exists within one of said multiple clusters, (d) determining a metric value for said one of the multiple clusters based on the number of documents within said one of the multiple clusters having a label identifying the determined dominant topic and (e) labeling at least documents from the second plurality of documents within said one of the multiple clusters with the label identifying the dominant topic when the metric value exceeds a predetermined threshold.

Figure 1:
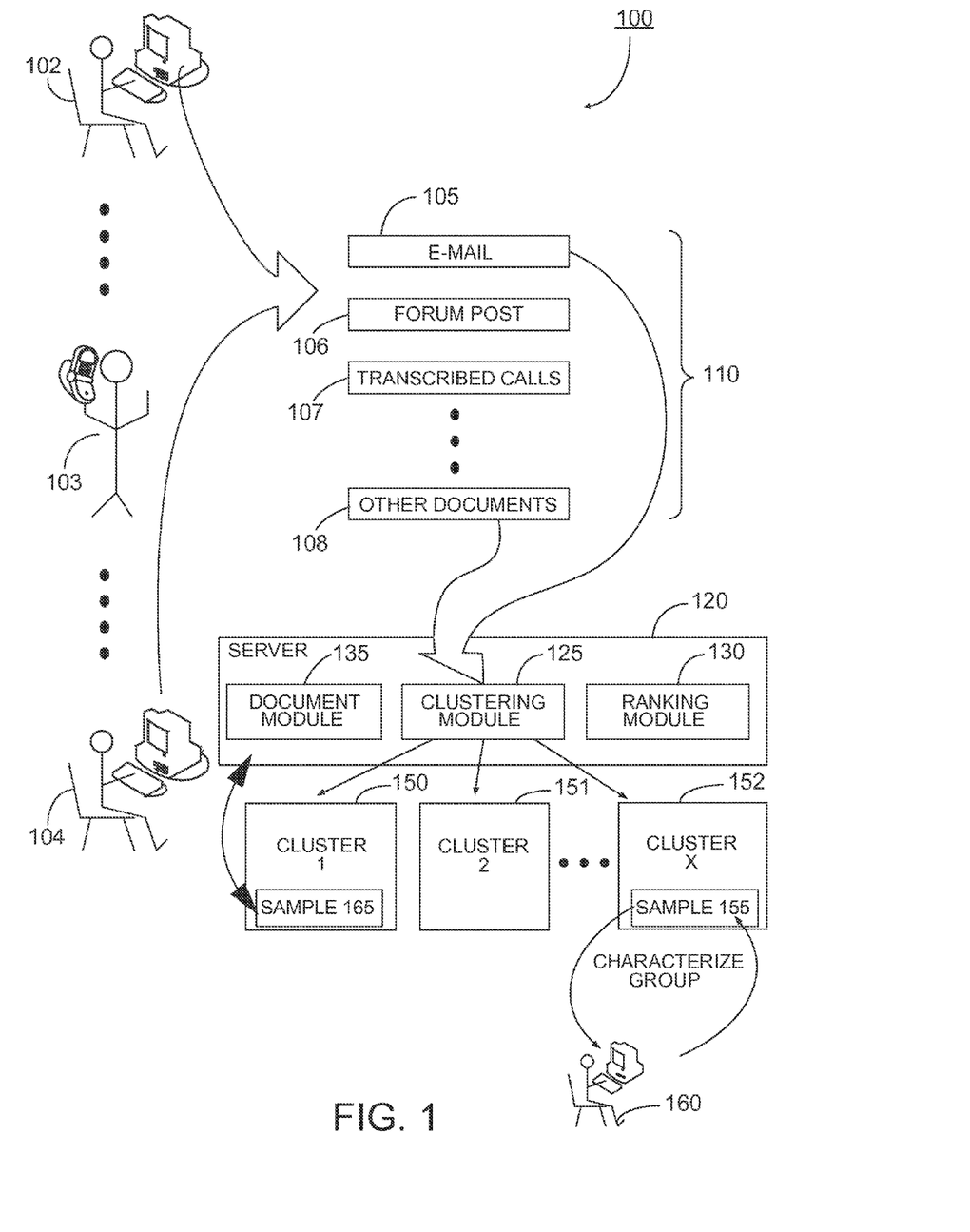
FIG. 1 is a diagram of an example environment for grouping documents.

FIG. 1 is a diagram of an example environment 100 for partitioning a set of documents 110. In the environment 100, users of a product (illustrated as users 102, 103 and 104) provide information, such as complaints, comments relating to the product, etc. that form at least a portion of documents 110. Although only three users are depicted, any number of users may provide the information. The number of users may even reach into the hundreds, thousands, or more. The product can be considered as any type of goods or service. For example, the product can be, but is not limited to, an e-mail service, an advertising service, an Internet Protocol (IP) telephone service, a computer operating system, an electronic device such a computer or smartphone, or an automobile. The information can be provided, for example, in customer-related meetings such as customer support sessions.

User-provided information forming the documents may be received from the number of users continually, over a period of time (e.g., days, weeks, months, years, or more) such that comments and/or complaints related to the product, etc. are current on the perception and/or performance of the product as understood by the users.

In some implementations, the user-provided information can include feedback about the product's performance including, but not limited to, general complaints about the product, issues relating to specific features or operation of the product, and positive comments about the product. The feedback may include statements such as "my laptop would not boot," "my wireless keyboard does not seem to work," "I can't access my advertising account," and "color prints from my printer are getting smudged." Even though the set of documents 110 relates to customer service or support scenario, it should be noted that the present disclosure applies to various other environments in which documents are grouped into clusters. For example, the methods and systems described can be applied/used to cluster patents or technical literature based on different technologies, or to cluster a collection of movie reviews based on genres. In some implementations, the set of documents 110 can vary according to the environment or application. For example, in the customer support environment 100 depicted in FIG. 1, the set of documents 110 includes feedback documents from the users 102-104 through any appropriate mechanisms, including telephones and computers.

The information may include documents such as e-mail messages 105, posts to discussion forums 106, transcriptions of telephone calls 107, and any other document 108 that conveys feedback information, including, for example, records of chat sessions. Documents 110 are provided to a server 120, which can include a clustering module 125 and a ranking module 130. Clustering module 125 may execute a clustering algorithm to group together documents included in the set of documents 110 that are similar to each other in some sense. In some implementations, the clustering module 125 can be a part of a clustering engine that resides on the server 120.

In some implementations, clustering can include partitioning documents based on some information that is common to the documents. For example, the clustering module 125 can identify information, such as words, phrases, or other textual elements that are common to two or more documents of the corpus. In some implementations, the words are not predefined, but rather are identified based simply on their presence in the documents. Such information, that is not predefined but extracted based on parsing the documents, may be referred to as unplanned information. The clustering module 125 can define clusters corresponding to such unplanned information (e.g., words), and associate documents with corresponding clusters. For example, the clustering module 125 may identify one or more words or phrases, such as "inbox" and "capacity" that are common to at least some of the documents. In such cases, since unplanned terms are used to define clusters, the clustering module 125 can define clusters that might not have been predicted and, therefore, might not otherwise have been identified. In the above example, the clustering module 125 may define a cluster that contains documents (or references to documents) having both the words "inbox" and "capacity" in their text. Another cluster may include documents having both the words "drop" and "call," and so on. In some implementations, one or more rules can specify, e.g., what words may be used for clustering, the frequency of such words, and the like. For example, the clustering module can be configured to group together documents where a given word or synonyms of the given word are present more than five times. In another example, the clustering module 125 can be configured to group together documents where any of a pre-defined set of words is present at least once.

In some implementations, the clustering module 125 produces document clusters 150, 151, 152. Although only three clusters are shown, any number (e.g., one or more) of clusters may be produced. In unsupervised clustering, the significance of a given cluster (e.g. what the cluster represents) is generally unknown. Accordingly, each cluster may need to be labeled. Labeling a cluster with a label can include assigning the label to each document within the cluster. The labeling process may be automatic or manual. For example, a sample 155 may be chosen (e.g. pseudo randomly) from the cluster 152 and read by an operator 160 to identify the subject matter of the sample 155. The cluster 152 may be characterized based on the subject matter identified for one sample (e.g., sample 155) or multiple samples. For example, in a cluster where the words "inbox" and "capacity" occur frequently in the documents, one or more samples can be analyzed to identify that the subject matter generally pertains to complaints on e-mail inbox capacity. In such cases, the cluster can be labeled accordingly (e.g., with a label: "problems with email inbox capacity").

In some implementations, a cluster (e.g. cluster 150) can be labeled by automatically analyzing one or more samples (e.g. a sample 165) from the cluster 150. In such cases, the automatic analysis of the sample can be performed on a computing device, such as the server 120 or other type of computing device. In some implementations, the server 120 can include a labeling engine (not shown) that facilitates operations to automatically label document clusters. In some implementations, where the set of documents 110 is augmented by new documents, a cluster can be automatically labeled based on determining a distribution of the previously clustered documents contained in the cluster. For example, a cluster can be automatically labeled based on the number of previously clustered documents with a given label that end up in the cluster. In some implementations, a cluster can be automatically labeled based on a relative proportion of a given label to the total number of previously clustered documents. Such a determination, and hence the automatic labeling on the cluster can be facilitated by the clustering engine and/or the labeling engine. Examples of such automatic labeling are described below with reference to FIG. 2. The labeling engine can reside or execute on a computing device such as the server 120 and/or server 220.

In some implementations, the server 120 can also include a document module 135 for processing the set of documents 110. For example, in a customer support environment, the document module 135 may retrieve different types of communications from various users, locations, and format and process the communications such that they share a common document (e.g., textual) format. The communications may be retrieved from a voicemail server (e.g., transcribed telephone calls), from a forum server (e.g., forum posts), from an e-mail server (e.g., e-mails), or from other sources (e.g., servers or other devices) not described here. Retrieval may include requesting and receiving communications relating to a product or service from the various sources and/or performing a direct memory access of storage locations in the various sources for the communications. In some implementations, each source can maintain one or more databases or the like, that stores the various communications, and each source can perform keyword searches of their databases, e.g., to identify communications relating to particular products, services or other items. In some implementations, a communication can be parsed to identify the communication.

The document module 135 may format the documents that it receives so that the resulting documents have a common format. For example, tags or other identifiers, if present, may be removed from the retrieved documents or otherwise modified. Other types of formatting may also be performed, e.g., to remove or modify any formatting codes, headers or other such information.

In some implementations, the document clusters may be ranked using the ranking module 130, which may also be executed on the server 120. In some implementations, the ranking module 130 ranks document clusters according to one or more metrics. For example, the ranking module 130 may rank the clusters 150, 151 and 152 according to an estimated time to resolution of an issue represented by the cluster (e.g., issues represented by a cluster "software update" may typically be resolved faster than issues represented by a cluster "hardware malfunction"), a label assigned to the cluster, a number of documents in a cluster, a designated importance of subject matter associated with a cluster, identities of authors of documents in a cluster, or a number of people who viewed documents in a cluster, etc. In an example, a cluster representing an issue that historically has taken a longer time to resolve may be ranked higher than a cluster representing an issue with a shorter historical time to resolution. In another example, several metrics are weighted and factored to rank the clusters. The ranking module 130 can be configured to output the rankings to a storage device (e.g., in the form of a list or other construct).

The information obtained by grouping documents into clusters and labeling the clusters may be used to identify problem(s) or other issues with a product or service and to provide appropriate resolution paths. For instance, in response to identifying a cluster (with a label) as "problems with e-mail inbox capacity," a person or department responsible for maintenance of e-mail systems can be contacted to resolve the problem. The resolution could involve instructing the person or department to increase the capacity of e-mail inboxes, or to provide users with an option to increase the inbox capacity (e.g., for an additional fee). The rankings provided by the ranking module 130 may indicate level(s) of importance to the document clusters. The topic(s) (e.g., problems or other issues), identified by the labels assigned to the document clusters, may be addressed in order of importance.

Figure 2:
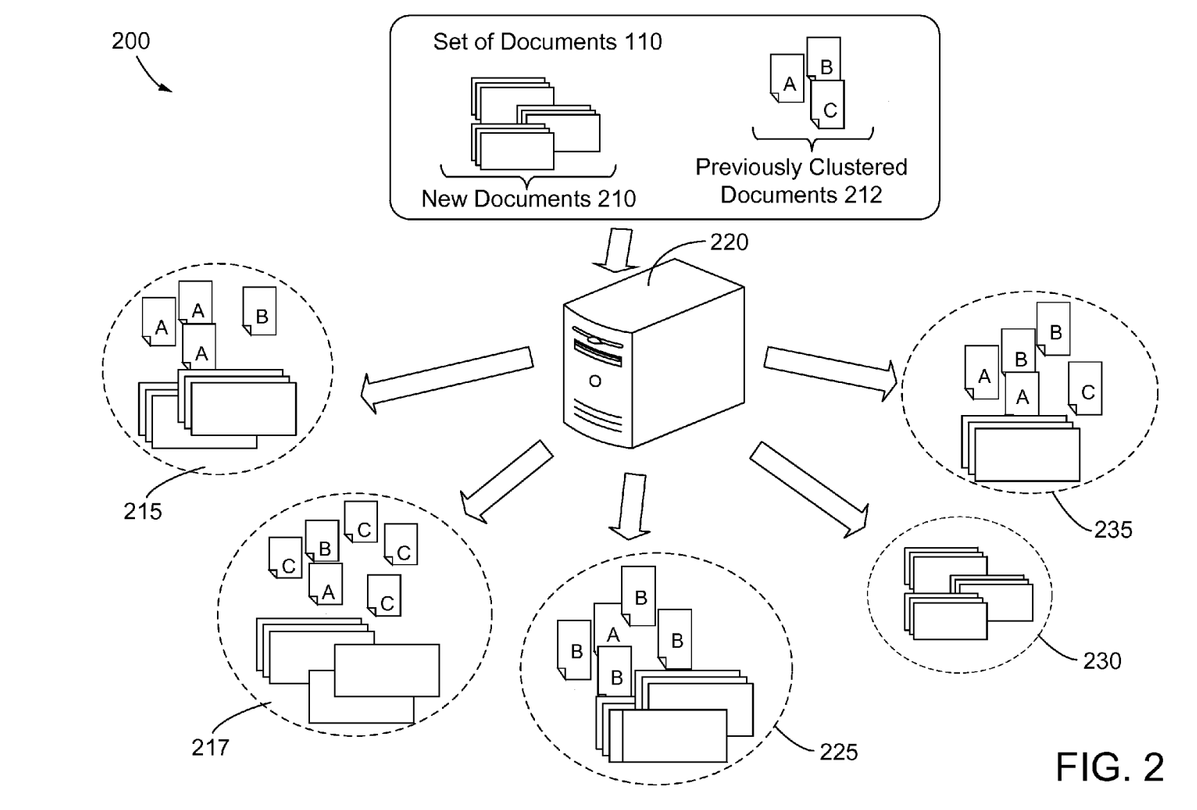
FIG. 2 is a diagram of a system for automatic labeling of document clusters.

FIG. 2 is a conceptual diagram of a system 200 for automatic labeling of document clusters. The system 200 includes a server 220 that supports the automatic labeling of clusters described herein. The server 220 can include a labeling engine that facilitates operations for automatic labeling of the document clusters. In some implementations, the server 220 can be substantially similar to the server 120 described with reference to FIG. 1. The server 220 can be configured to store, receive or otherwise access the set of documents 110. In some implementations, the set of documents 110 includes a plurality of previously clustered and labeled documents 210 and a plurality of new documents 210. Generally, after performing one or more clustering and labeling operations, additional new documents are continually received from users. Rather than start with a set of documents, including the original form of the documents previously clustered, server 220 is configured to access the set of documents 110, including the previously clustered documents 212 and new documents 210. In this manner, the clustering and/or labeling of the documents 212 is preserved, such that the efficiency and speed of labeling the plurality of new documents 210 is improved.

It should be appreciated that the set of documents may further include one or more additional previously clustered documents that do not have labels. Specifically, during previously clustering or labeling, one or more metrics (e.g., a purity score) may not have permitted a documents to be labeled. In subsequent clustering operation, such as illustrated in FIG. 2, one or more documents may be previously clustered, yet unlabeled. Accordingly, when the set of documents 110 includes a plurality of previously clustered and labeled documents 210, other previously clustered and unlabeled document may also included.

Even though FIG. 2 depicts only three labels for previously clustered documents 212, many more different labels can be used. The labels associated with the previously clustered documents 212 can be assigned in various ways, or combination of ways. In some implementations, the labels can be assigned by a manual review process, derived from metadata associated with the documents, and/or assigned by a prior automated process of labeling the documents.

The server 220 can be configured to group documents from a document corpus into various clusters (e.g. 215, 217, 225, 230 and 235). In some implementations, the server 220 executes a clustering algorithm on the set of documents 110. In general, the clustering algorithm analyzes features from the documents in the set of documents 110 and groups documents based on some similarity of the document features or other similarities. Various clustering algorithms can be used to group documents from the set of document 110. In some implementations, the clustering algorithm determines the intrinsic grouping in a set of unlabeled data. In such cases, even when previously clustered documents 212 are included in the set of document 110, the algorithm may cluster the documents based on their content or features with little or even no consideration given to previously applied labels. The nature and type of clustering algorithm, in general, depends on the nature of the document corpus and/or on the type of results expected or desired. For example, the clusters that are identified may be exclusive, so that every document from the corpus belongs in only one cluster. In some implementations, the clusters may allow for overlapping, e.g., one document may be placed into several clusters. The clusters could also be probabilistic, whereby a document belongs to a cluster based on a certain assigned probability. In some implementations, the clusters can be hierarchical, such that there are different numbers and/or types of clusters at different granularities. For example, customer support documents can be clustered into "questions," "feedback," and "complaints" at a high level and further clustered at a finer level into "hardware," "software" and "firmware" within each of the high level clusters.

The clustering algorithms can be parametric or non-parametric. In general, parametric methods may minimize a cost function or an optimality criterion that associates a cost to each document-cluster assignment. Such parametric methods may solve an optimization problem to satisfy the optimality criterion imposed by a model, which often attempts to minimize the cost function. Parametric approaches usually include some assumptions about the underlying data structure. Non-parametric approaches, on the other hand, usually do not include assumptions about the corpus but are based on detecting similarities or dissimilarities among documents of the corpus.

Parametric clustering algorithms can be based on generative (or probability based) or reconstructive models. The basic idea of a generative or probability based model is that the input vector or document corpus x1, x2, . . . , xm are observations from a set of K unknown distributions E1, E2, . . . , EK. The density of an observation xk with respect to Ei is given as fi(xk|θ). The probability that probability that xk belongs to the distribution Ei can be denoted by τki. In some implementations, the parametric clustering algorithm can be used to determine the parameters θ and τ that maximize a likelihood function such as:

$$L(\theta, \tau) = \sum_{r=1}^{n} \ln\left(\sum_{i=1}^{K} \tau_k^2 f_i(x_k|\theta)\right) \quad (1)$$

Various iterative expectation-maximization (EM) schemes can be used to optimize the above equation. Examples of generative models can include a Gaussian mixture model, or a fuzzy clustering model such as the C-Means fuzzy clustering. Reconstructive parametric models in general attempt to minimize cost functions associated with the respective models. Various reconstructive models are possibly based on the techniques used to model and minimize the cost functions. Examples of reconstructive parametric models include K-means algorithm, K-median algorithm, deterministic annealing, etc.

Non-parametric approaches to clustering could include algorithms such as agglomerative algorithms or divisive algorithms. In general, agglomerative algorithms merge clusters depending on how similar they are, and divisive algorithms split them. The number of clusters can also be determined by a threshold sometimes referred to as a merging threshold. For example, for a merging threshold of zero, the number of clusters is equal to the number of data points (e.g. documents), and for a sufficiently high threshold, the data is partitioned into a single cluster. In general, non-parametric clustering algorithms do not make any assumptions about the underlying data distribution. Examples of nonparametric clustering algorithms include vertical clustering algorithms such as average linkage clustering, centroid linkage clustering, complete linkage clustering, single linkage clustering, etc. In some implementations, a machine learning paradigm known as conceptual clustering may also be used as a clustering algorithm. Other examples of clustering algorithms include quality threshold (QT) algorithm, locally-sensitive hashing, graph theoretic methods, spectral clustering, etc.

When previously clustered documents 212 are included in the set of documents 110 on which a clustering algorithm is executed, at least some of the previously clustered documents 212 can end up in the various resultant clusters. For example, the cluster 215 includes three previously clustered documents labeled as "A" and one previously clustered document labeled as "B." Similarly, the cluster 217 includes four previously clustered documents labeled as "C," one previously clustered document labeled as "A," and one previously clustered document labeled as "B." In general, the previously clustered documents 212 are not treated differently by the clustering algorithm than any other document from the set of documents 110. Therefore, whether or not a previously clustered document ends up in a particular cluster, is dependent on a feature, e.g. content, characteristic, subject, etc., of the previously clustered document and not on the label associated with the previously clustered document. In some cases, a resultant cluster, for example the cluster 230, may end up not having any previously clustered document. In some implementations, some of the documents may remain unclassified at the end of the clustering process.

In some implementations, the distribution of the previously clustered documents in a resultant cluster can be used to identify a characteristic or feature representative of the resultant cluster. For example, if a given cluster includes a large number of a certain type of previously clustered document (e.g. ones with the label "B"), the given cluster may be identified as having documents similar in subject matter identified by the label "B." In some cases, such a cluster can be automatically assigned the label "B." In some implementations, automatic labeling of a resultant cluster includes determining a label indicating a dominant topic for the cluster based on the distribution of previously clustered documents within the cluster. For example, for a given cluster (e.g., cluster 215), if the number of previously clustered documents with label "A" exceeds the number of previously clustered documents with either label "B" or "C," the label "A" can be selected as identifying the dominant topic for the given cluster. A labeling engine can be used for the automatic labeling described herein. The labeling engine can include any combination of software and hardware modules and may reside on the server 220.

Even though the example in FIG. 2 shows only three types of labels for the previously clustered documents 212, and only five different resultant clusters, many more different types of labels and clusters could be possible. For example, the number of different types of labels and/or resultant clusters could be in hundreds, thousands or millions without deviating from the scope of the present disclosure.

Typically, a label with the most number of occurrences in a given cluster can be selected as identifying a dominant topic for the given cluster. In some implementations, one or more metric values may be calculated to determine whether a label identifying a dominant topic (or any information related to a dominant label) can be used to identify a given resultant cluster. For example, if the number of previously clustered documents with the label identifying the dominant topic in a given cluster is ten, whereas the number of total documents in the given cluster is ten thousand, the label identifying the dominant topic may not be a representative label for the given cluster. Similarly, if a given cluster has five previously clustered documents with the label "A," and four documents each with labels "B," and "C," the label "A" may not be an accurate representative label for the given cluster. Therefore, the total number of documents in a given cluster as well as the number of previously clustered documents that get partitioned into the given cluster can be used in determining whether a label identifying a dominant topic accurately represents the content of a cluster. In some implementations, calculating the metric values based on the distribution of the previously clustered documents in a given cluster facilitates a determination whether the label from a previously clustered document can be used as a label for the given cluster. The metric values may be calculated by the labeling engine or any other software or hardware module (e.g. a processor). In some implementations, such metric values may be calculated only after a determination that a threshold number of previously clustered documents are present within the cluster. For example, if a very small number of previously clustered documents end up in a cluster, the labeling engine may flag the cluster for manual review or other suitable labeling processes. In some implementations, more than one label may be selected as a label identifying a dominant topic for a cluster. For example, if a significant number of documents with label "A" and a significant number of documents with label "C" show up in a cluster, both labels "A" and "C" may be assigned to the cluster. In some implementations, the cluster may also be defined using a new label (e.g. "D") that represents characteristics of labels "A" as well "C."

In some implementations, a ratio of the number of documents corresponding to the label identifying the dominant topic to the total number of previously clustered documents in a cluster can be calculated as a purity score of the label identifying the dominant topic. For example, if for a given cluster, the number of previously clustered documents with labels "A," "B," and "C" are represented as $n_A$, $n_B$, and $n_C$, respectively, then the purity score of the dominant label (or the label identifying the dominant topic) can be calculated as:

$$\text{Purity Score} = \max(n_A, n_B, n_C)/(n_A + n_B + n_C) \quad (2)$$

wherein $\max(n_A, n_B, n_C)$ is the number of previously labeled documents corresponding to the dominant label. Therefore, if a high percentage of previously clustered documents within a cluster correspond to the dominant label, the dominant label could more likely be representative of the documents grouped together into the cluster. On the other hand, if only a low percentage of previously clustered documents correspond to the wining label, the dominant label is less likely to be a representative of the corresponding cluster. In some implementations, even when a high percentage of previously clustered documents within a cluster correspond to the dominant label, additional metrics may be needed to determine whether the dominant label could be used to represent the cluster. For example, consider a cluster that includes eight previously clustered documents with the label "A," one previously clustered document with the label "B," one previously clustered document with the label "C," and the cluster includes ten thousand documents in all. In such cases, even though the purity score of the label "A" is significantly high (80%), the label may not be a good representative of all the documents in the cluster because of the very low number of corresponding previously clustered documents compared to the size of the entire cluster. In some implementations, identification of the dominant label for a cluster can depend, at least in part, on determining if a high percentage of documents with a given label ends up in the cluster. In some implementations, the ratio of the previously clustered documents in a given cluster to the total cluster size can be calculated as a measure of confidence on the previously clustered documents. For example, if for a given cluster, the number of previously clustered documents with labels "A," "B," and "C" are $n_A$, $n_B$, and $n_C$, respectively, and the total number of documents in the given cluster is N, the measure of confidence can be given by:

$$\text{Confidence} = (n_A + n_B + n_C)/N \quad (3)$$

As evident from equation (3), the higher the percentage of previously clustered documents within a given corpus, the more reliable the process of using the previously clustered documents for automatic labeling of clusters.

In some implementations, both the purity and confidence metric values are calculated to determine if a dominant label can be reliably used as a label or identifier for a given cluster. In some implementations, whether or not a dominant label can be reliably used for a given cluster, depends on one or more threshold conditions on the metric values. For example, a dominant label may be used as a label for a given cluster if both the purity score and confidence exceed corresponding thresholds. In some implementations, one metric value may be given a higher weight in deciding whether to use the dominant label to identify a cluster. For example, if for a given cluster, the purity score exceeds the corresponding threshold but the confidence metric value does not, the given cluster may still be labeled with the dominant label. In some implementations, the weight can be inherently specified by the corresponding thresholds. For example, the threshold for the purity score may be specified as 50% whereas the threshold for the confidence metric value is a higher value, such as 70% or 80%, thereby placing a higher weight or importance on the confidence metric value in deciding if the dominant label is a suitable one. The thresholds for the metric values can be chosen on a case-by-case basis depending on the size of corpus, nature of documents, reliability of the previously clustered documents, or other factors.

In some implementations, determining whether the metric values satisfy the threshold conditions can be done in a hierarchical basis. For example, whether or not the purity score satisfies the corresponding threshold condition can be determined only if the confidence metric value satisfies the corresponding threshold condition. In some cases, such determinations may be performed in parallel.

If one or more metric values fail to satisfy the threshold conditions, the corresponding cluster can be designated for manual or further review. For example, if for a given cluster either or both the purity score and the confidence metric value do not exceed the corresponding specified thresholds, the cluster may be designated (for example, by an appropriate identifier or label) for manual or further review. In some cases, a cluster (such as the cluster 230) may not have any previously clustered documents and can be flagged for manual or further review. The designation for manual review may be executed by the labeling engine or any other combination of software and hardware modules residing on the server 220.

Figure 3:
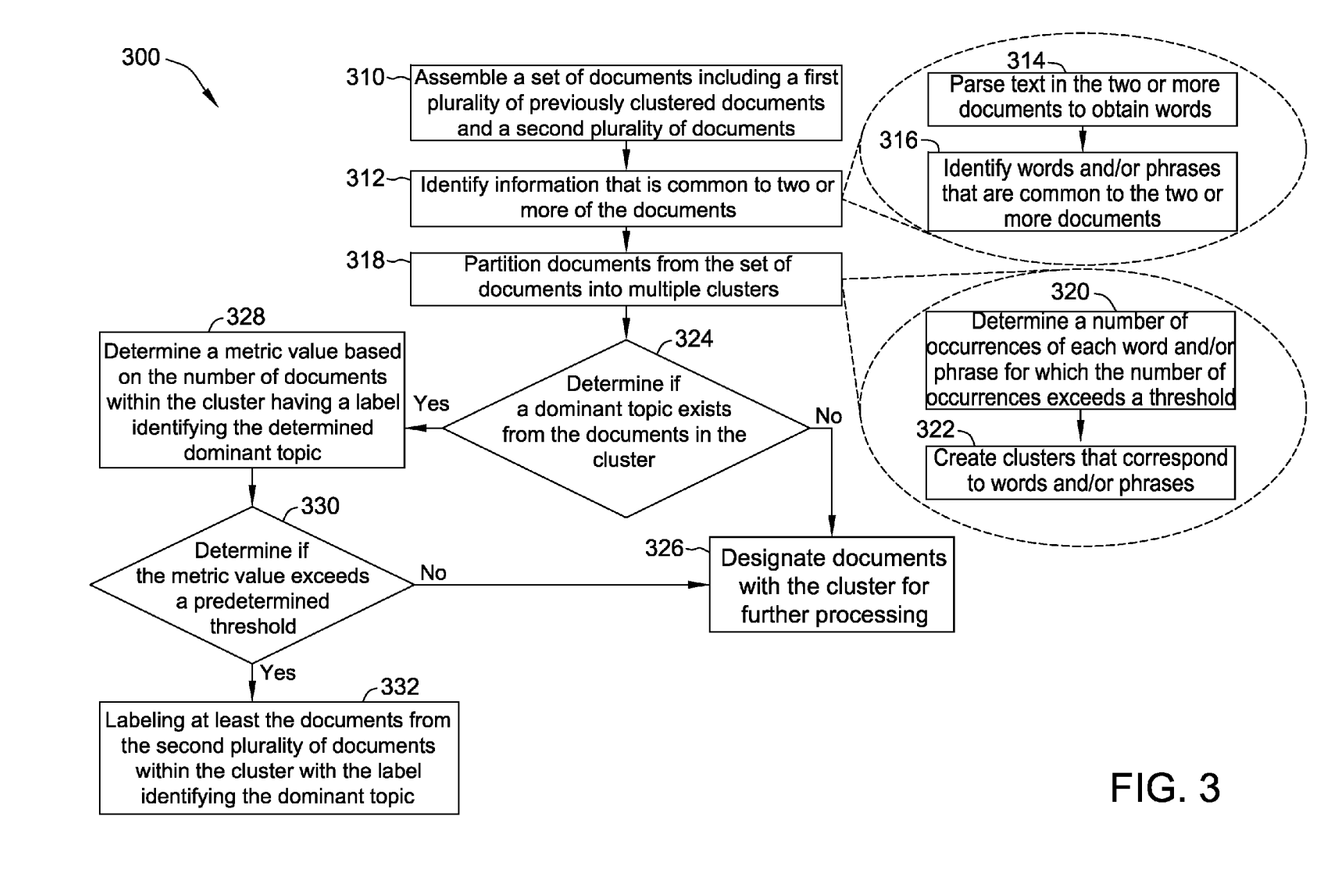
FIG. 3 is a flowchart of an exemplary method for labeling documents that may be performed by the system shown in FIGS. 1 and 2.

FIG. 3 shows a flowchart 300 that shows exemplary method 300 for use in clustering the set of documents 110 and for automatically labeling the clusters. The operations can be performed by any combination of the document module 135, the clustering module 125 (including clustering engine and/or labeling engine), and the ranking module 130 on one or more servers such as the server 120 and/or the server 220. The method 300 proceeds to assemble 310 a set of documents, including a first plurality of previously clustered documents (e.g. the previously clustered documents 212 described with reference to FIG. 2) and a second plurality of documents (e.g., the plurality of new, unlabeled documents 210 described with reference to FIG. 2). The previously clustered documents often include documents labeled using manual review, automatic labeling consistent with the description of the system of FIG. 1, or both. Generally, prior to and throughout the labeling process, the labels provided to previously clustered documents 212, during prior processes and/or analysis are maintain with the documents, unless one or more documents is/are re-labeled. The labels retained with previously clustered documents 212 may be a basis for labeling other previously clustered and unlabeled documents or new documents 210, clustered with such previously clustered and labeled documents 212, as described below.

Figure 4:
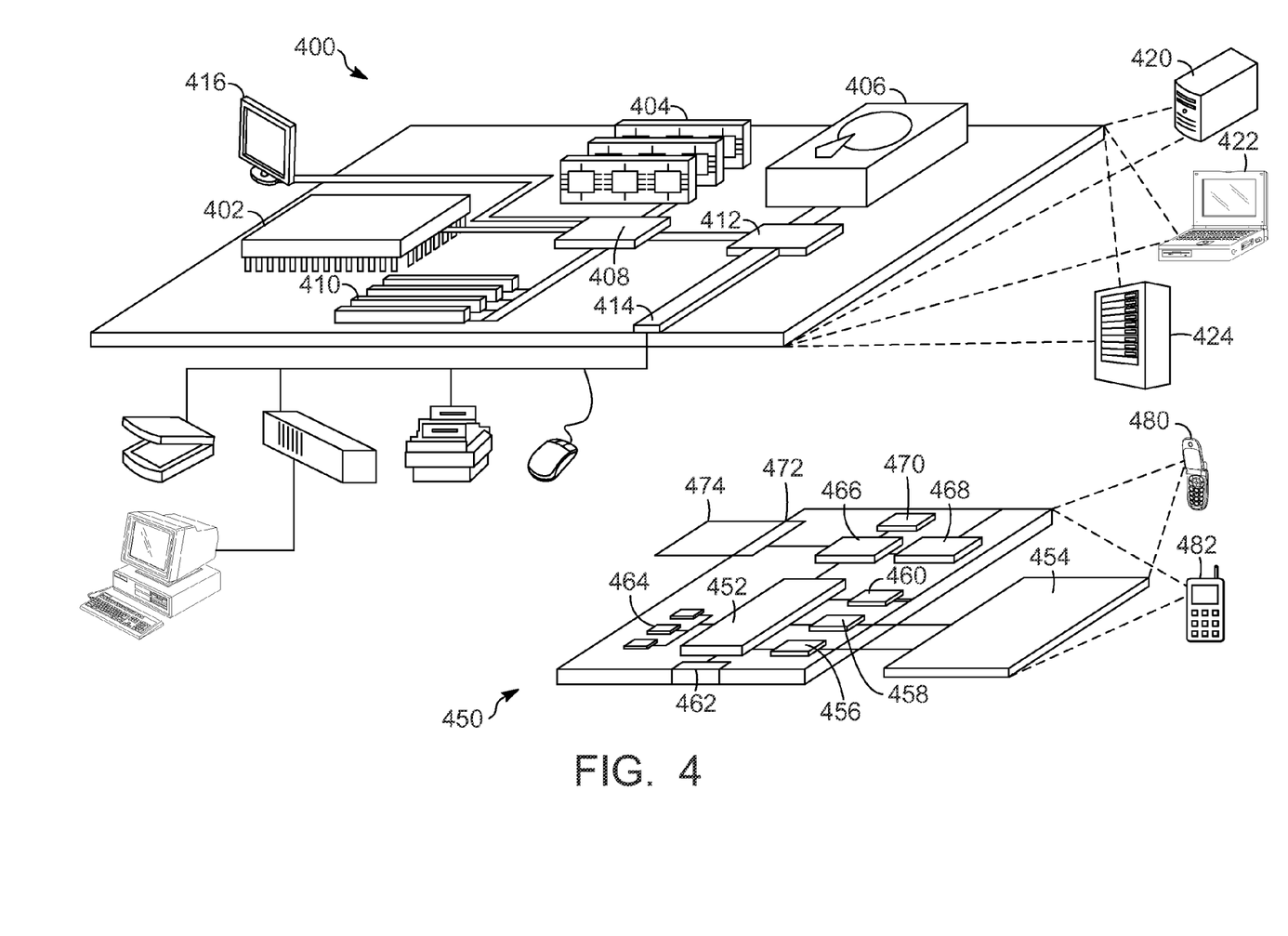
FIG. 4 is a block diagram showing example or representative computing devices and associated elements that may be used to implement the systems of FIGS. 1 and 2.

The previously clustered documents can be received and/or retrieved from a storage device (e.g., storage device 406) where the documents 212 are stored. In some implementations, the second plurality of new documents 210 are retrieved, for example by the document module 135, from various locations (e.g., the storage device), and/or formatted into a common document (e.g., textual) format. In some implementations, the documents can pertain to communications more recently received at a customer support division. In such cases, the communications may be retrieved from a voice message server (e.g., transcribed telephone calls), from a forum server (e.g., for forum posts), from an e-mail server (e.g., for e-mail), or from other sources (e.g., servers or other devices). Retrieval may include requesting and receiving recent and/or new communications relating to a product from the various sources and/or performing a direct memory access of storage locations in the various sources for the communications. In this regard, each source may maintain a database (s) or the like, which store the various communications, and each source can perform keyword searches of their database (s), e.g., to identify communications relating to particular product(s) or other items.

Other types of formatting may also be performed, e.g., to remove any formatting codes, headers or other such information. It is noted the operations described with reference to FIG. 3 need not format the communications as described, and that process may be performed on communications having different formats. For example, process may be performed on communications that are received from various sources in their native format, e.g., in the format that they are received. As shown in FIG. 3, method 300 may proceed to identify 312 information that is common to two or more of the documents 110 that are assembled. In an example, this information may include words, phrases, and/or combinations thereof that are common to two or more of the documents. For example, words such as "e-mail" and "account" may be common to two or more documents. Likewise, phrases such as "e-mail account" and "inbox capacity" may be common. In other examples, combinations of words and/or phrases that are common to two or more documents may also be identified. For example, the combination of "e-mail" and "inbox capacity" may be identified as being common to two or more documents. In another example, the combination can include the phrases "inbox capacity" and "e-mail account". In general, any number of words, and/or phrases can be included in the combination. In some implementations, other document characteristics can also be used in identifying common information between documents. For example, images (e.g., based on metadata or tags associated with the images), equations, tables, links, or other content can be used in identifying common information between various documents.

In some implementations, common information between documents is identified by the clustering module 125. In the case of words and phrases, the clustering module 125 may parse 314 text in two or more, or various documents in order to identify 312 such information. Phrases can be identified in various ways, e.g., by reference to a library of phrases and/or a syntactic lexicon that identifies sentence structure, parts-of-speech, and other grammatical features that may be used to identify words and/or phrases. Data for such a library or syntactic lexicon may be stored in the server 120 or in any other place that is accessible to the clustering module 125.

In some implementations, the clustering module 125 identifies 316 words and/or phrases in the parsed text, as part of identifying 312 information common to two or more of the documents. The words and/or phrases may be identified without regard to affixes (e.g., prefixes or suffixes). In some implementations, the affixes can be identified by, and/or discounted by the clustering module 125 using, e.g., the syntactic lexicon mentioned above. For example, if various documents relate to hard drive crashes, the clustering module 125 can be configured to recognize words such as "crash," "crashed," "crashing," crashes," to be originating from a single word "crash.". In some implementations, the clustering module 125 can be configured to recognize synonyms as common words. A library of synonyms can be accessed to identify commonalities. For example, the clustering module 125 can identify "e-mail," "electronic mail," and "email" as referring to the same thing. In another case, the clustering module 125 can be configured to recognize different words or word combinations as referring to the same thing. For example, the clustering module 125 can be configured to identify "inbox capacity" and "inbox storage," "cell phone" and "mobile phone," or "elevator" and "lift" as referring to the same thing in each case.

In proceeding with method 300, the clustering module 125 may partition 318 documents from the set documents 110 into multiple clusters. In some implementations, the documents are partitioned into clusters based on the information (e.g., words, phrases) identified as common to two or more documents. Consistent with the system of FIG. 2, any number of clusters can be defined. Furthermore, as noted above, the words and/or phrases that act as the bases for clustering the documents can be unplanned, i.e. not identified beforehand. In such cases, the clustering module 125 can define clusters that might not have been predicted and, therefore, otherwise identified.

In one or more implementations, the clustering module 125 can exclude certain predefined words or "stop words" from consideration as a basis for partitioning documents into clusters. For example, conjunctions, such as "and," "but," and "or," and/or pronouns, such as "I," "you," "he," "she," and "it" can be excluded. In general, such words and/or phrase are frequently appear in all or most of the documents in the set of documents 110, for example, and therefore are not useful in determining the topic of the document and/or the topic of a cluster in which the documents is partitioned.

For words and/or phrases that are identified 312 as common to two or more documents (and not excluded), methods 300 may determine 320 a number of occurrences of such words and/or phrases in each document for which the number exceeds a threshold, in order to partition 318 such documents. In some implementations, the clustering module 125 is able to partition 318 documents into clusters based on the words and/or phrases exceeding the threshold.

In some implementations, the clustering module 125 creates 322 clusters that correspond to words and/or phrases that are common to two or more documents in order to partition such documents. In some implementations, clusters can only be created for common words that exceed a minimum number of occurrences in a minimum number of documents. The clusters can be stored in a storage device, for example as a database in the server 120. In some implementations, entire documents within a cluster can be stored. Alternatively, only a portion, e.g., a chapter, page, paragraph, etc., of each document within a cluster can be stored. In some implementations, the identity of each document can be stored, along with information such as the author of the document, a source of the document, a creation date of the document, etc.

In some implementations, the clustering module 125 may determine 324 if the documents of the cluster have a dominant topic. In some implementations, a label associated with previously clustered document 212 that is most abundant within the cluster can be identified as a dominant label, which indicates the dominant topic. In some cases, weights or orders of importance can be associated with the labels in determining a dominant label. For example, previously clustered documents with a given label (e.g., label "A") may influence labeling twice as much as previously clustered documents with another label (e.g., label "B"). In such cases, each occurrence of documents with label "A" within a cluster is given twice as much weight than documents with label "B" in determining the dominant label. In this example, if three documents with label "A" and four documents with label "B" are present in a cluster, label "A" is typically be identified as the dominant label by virtue of the corresponding weight even though the number of documents with label "B" is greater. In some cases, a clear dominant label may not be present within the given cluster. This can happen, for example, when no previously clustered document is present in a given cluster or when the number of previously clustered documents (with or without corresponding weights) for two or more label types is not significantly different. For example, if a given cluster includes twenty documents with label "A", twenty-one documents with label "B" and nineteen documents with label "C", a clear dominant label may not be identified.

In case a dominant label is not present, the labeling engine may designate 326 documents within the cluster for further processing. This can be done automatically (e.g., without user intervention) or manually. In at least one implementation, method 300 may specifically include designating 326 the cluster and/or document included therein for manual processing. In some implementations, a sample of documents can be selected from the cluster parsed or read to determine a new topic or subject matter of the documents. The cluster can then be associated with that new topic. The selecting, reading, and/or parsing be performed manually (e.g., by one or more personnel manually reading documents from the cluster) or automatically (e.g., using word recognition processes), and may be repeated for additional sample documents until an identifying characteristic for a cluster is determined. Additionally, or alternatively, manual and/or automatic review may be performed to determined that the cluster is a mixed cluster having documents related to multiple topics.

When a dominant label is present, operations can determine 328 a metric value for the cluster based on the number of documents within the cluster having a label identifying the determined dominant topic, i.e., a determined dominant label. The metric values determined can include statistical measures that provide information on a relative distribution of the dominant label within the cluster as compared to labels from other previously clustered documents and/or to the total number of documents in the cluster. For example, metrics such as purity score and confidence, described above with reference to equations (2) and (3), respectively, can be calculated.

Method 300 proceeds to determine 330 if the metric value exceeds or does not exceed a predetermined threshold. The predetermined threshold may be different in various implementation. For example, a predetermined threshold may be about 75% in some implementations, and about 80% in other implementations, or a different percentage in other implementations. A wide variety of thresholds related to purity score, confidence, or other metric values, presented as percentages and/or absolute values, may be used in various implementations to determine in sufficient confidence exists to label the new documents 210 within the clusters with the dominant label for the cluster.

If the metric value exceeds the predetermine threshold, labeling engine labels 332 at least the new documents 210 within the cluster with the dominant label. Labeling the dominant label to the cluster, in general, includes associating the cluster with the dominant label. In some implementations, assigning the dominant label can include storing, at a storage location, identification information that ties the documents from the corresponding cluster with the dominant label. In some implementations, the dominant label can be assigned to each document within the cluster. In some implementations, the dominant label is assigned only to previously unlabeled documents in the cluster while labels of the previously clustered documents are left unchanged. Previously unlabeled documents can refer to any document within the cluster as long as they do not belong to the set of previously clustered documents. Assigning the dominant label can include assigning a new label or changing an existing label of one or more previously clustered documents. In some cases, a newly assigned labels can co-exist with old labels.

As shown in FIG. 3, if the metric values are determined not to have satisfied the predetermined threshold, the cluster is designated 326 for further processing to identify a characteristic associated with the cluster, consistent with the description above. Further, while method 300 illustrated in FIG. 3 is a computer implemented process, it should be appreciated that one or more processes described herein may be subject to manual review and/or "spot checking" from time to time or periodically for purposes of quality assurance.

FIG. 4 is a block diagram showing example or representative computing devices and associated elements that may be used to implement the systems of FIGS. 1 and 2. FIG. 4 shows an example of a generic computing device 400 and a generic mobile computing device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface or controller 408 connecting to memory 404 and high-speed expansion ports 410, and a low-speed interface or controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a micro drive or other device, to provide additional storage. Each of the components 450, 452, 464, 454, 456, and 458, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 550. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 456, which may include digital signal processing circuitry where necessary. Communication interface 456 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 458. In addition, short-range communication may occur, such as using a Bluetooth, WiFi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 400 and/or 450) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 400 and 450 are configured to receive and/or retrieve electronic documents from various other computing devices connected to computing devices 400 and 450 through a communication network, and store these electronic documents within at least one of memory 404, storage device 406, and memory 464. Computing devices 400 and 450 are further configured to manage and organize these electronic documents within at least one of memory 404, storage device 406, and memory 464 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer-readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer implemented method comprising:
assembling a set of documents, the set of documents including a first plurality of previously clustered documents and a second plurality of documents, each of the first plurality of previously clustered documents having at least one label identifying a topic to which content of the document relates;
partitioning, by a non-transitory computing device, documents from the set of documents into multiple clusters;
determining, by the non-transitory computing device, that a dominant topic exists within a first cluster of said multiple clusters;
determining, by the computing device, (i) a purity score representing a first ratio of a number of documents having a label identifying the dominant topic in the first cluster to a total number of previously clustered documents within the first cluster and (ii) a confidence measure representing a second ratio of the total number of previously clustered documents in the first cluster to a size of the first cluster, wherein the size of the first cluster equals a total number od documents included within the first cluster; and
labeling, by the computing device, at least documents from the second plurality of documents within said one of the multiple clusters with the label identifying the dominant topic when the purity score exceeds a first predetermined threshold and the confidence score exceeds a second predetermined threshold.

2. The method of claim 1, further comprising determining that the purity score exceeds the first predetermined threshold upon determining that the confidence measure exceeds the second predetermined threshold.

3. The method of claim 1, wherein the second predetermined threshold is at least 80%.

4. The method of claim 1, further comprising designating the first cluster for further processing when the purity score fails to exceed the first predetermined threshold or when the confidence measure fails to exceed the second predetermined threshold.

5. The method of 4, wherein designating the first cluster for further processing includes designating the first cluster for manual processing.

6. The method of claim 1, wherein the set of documents includes at least one of email documents, social media documents, and customer input documents.

7. The method of claim 1, wherein the at least one label is a plurality of labels, said method further comprising:
assigning a respective weight to each label in the plurality of labels; and
determining the dominant topic based at least in part on the respective weights.

8. The method of claim 1, wherein partitioning documents from the set of documents into multiple clusters comprises parsing documents from the set of documents to extract occurrences of a plurality of textual elements, identifying at least one of the plurality of textual elements that are common to two or more documents, and grouping the two or more documents based on the identified at least one textual elements.

9. The method of claim 1, further comprising receiving the second plurality of documents, after assigning the at least one label to each of the first plurality of previously clustered documents and prior to assembling the set of documents.

10. A system comprising:
a non-transitory storage device configured to store a set of documents, the set of documents including a first plurality of previously clustered documents and a second plurality of documents, each of the first plurality of previously clustered documents having at least one label identifying a topic to which content of the document relates;
a clustering engine configured to:
partition documents from the set of documents into multiple clusters; and
determine that a dominant topic exists within a first cluster of said multiple clusters;
determine (i) a purity score representing a first ratio of a number of documents having a label identifying the dominant topic in the first cluster to a total number of previously clustered documents within the first cluster and (ii) a confidence measure representing a second ratio of the total number of previously clustered documents in the first cluster to a size of the first cluster, wherein the size of the first cluster equals a total number od documents included within the first cluster; and
a labeling engine configured to assign a label identifying the dominant topic to at least documents from the second plurality of documents within said one of the multiple clusters when the purity score exceeds a first predetermined threshold and the confidence score exceeds a second predetermined threshold.

11. The system of claim 10, wherein said clustering engine is further configured to determine that the purity score exceeds the first predetermined threshold upon determining that the confidence measure exceeds the second predetermined threshold.

12. The system of claim 10, wherein the second predetermined threshold is at least 80%.

13. The system of claim 10, wherein the set of documents includes at least one of email documents, social media documents, and customer input documents.

14. The system of claim 10, wherein the labeling engine is further configured to assign a label identifying the dominant topic to each document in the first cluster.

15. The system of claim 10, wherein the labeling engine is configured to designate the first cluster for further processing when the purity score fails to exceed the first predetermined threshold.

16. The system of claim 10, wherein the clustering engine is configured to parse documents from the set of documents to extract occurrences of a plurality of textual elements, to identify at least one of the plurality of textual elements that are common to two or more documents, and to group the two or more documents based on the identified at least one textual elements.

17. The system of claim 10, wherein the at least one label is a plurality of labels, said system is further configured to:
 assign a respective weight to each label in the plurality of labels; and
 determine the dominant topic based at least in part on the respective weights.

18. The system of claim 10, further configured to receive the second plurality of documents, after the at least one label are assigned to each of the first plurality of previously clustered documents.

19. A non-transitory computer-readable storage device having encoded thereon computer readable instructions, which when executed by a processor, cause the processor to:
 provide a set of documents, the set of documents including a first plurality of previously clustered documents and a second plurality of documents, each of the first plurality of previously clustered documents having at least one label identifying a topic to which content of the document relates;
 partition documents from the set of documents into multiple clusters;
 determine that a dominant topic exists within a first cluster of said multiple clusters;
 determine (i) a purity score representing a first ratio of a number of documents having a label identifying the dominant topic in the first cluster to a total number of previously clustered documents within the first cluster and (ii) a confidence measure representing a second ratio of the total number of previously clustered documents in the first cluster to a size of the first cluster, wherein the size of the first cluster equals a total number od documents included within the first cluster; and
 assign the label identifying the dominant to at least documents from the second plurality of documents within said one of the multiple clusters when the purity score exceeds a first predetermined threshold and the confidence score exceeds a second predetermined threshold.

20. The computer-readable storage device in accordance with claim 19, wherein said instructions additionally cause the processor to determine that the purity score exceeds the first predetermined threshold upon determining that the confidence measure exceeds the second predetermined threshold.

* * * * *